(12) United States Patent
Wen et al.

(10) Patent No.: US 11,222,093 B2
(45) Date of Patent: Jan. 11, 2022

(54) CHANGE OF VARIANCE DETECTION IN TIME SERIES DATA

(71) Applicant: Alibaba Group Holding Limited, Grand Cayman (KY)

(72) Inventors: Qingsong Wen, Issaquah, WA (US); Liang Sun, Bellevue, WA (US); Huan Xu, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 83 days.

(21) Appl. No.: 16/839,922

(22) Filed: Apr. 3, 2020

(65) Prior Publication Data

US 2021/0319081 A1    Oct. 14, 2021

(51) Int. Cl.
| | |
|---|---|
| *G06F 17/18* | (2006.01) |
| *G06F 17/15* | (2006.01) |
| *G06F 7/544* | (2006.01) |
| *G06F 11/34* | (2006.01) |
| *G06Q 10/04* | (2012.01) |

(52) U.S. Cl.
CPC ............ *G06F 17/18* (2013.01); *G06F 7/5443* (2013.01); *G06F 11/3452* (2013.01); *G06F 17/15* (2013.01); *G06Q 10/04* (2013.01)

(58) Field of Classification Search
CPC ..... G06Q 10/04; G06F 17/15; G06F 11/3452; G06F 7/5443; G06F 17/18
USPC .......................................................... 702/179
See application file for complete search history.

(56) References Cited

U.S. PATENT DOCUMENTS

| | | | | |
|---|---|---|---|---|
| 5,315,538 | A | * | 5/1994 | Borrell ..................... G01S 3/80 702/189 |
| 2019/0000390 | A1 | * | 1/2019 | Behnam ................ G06F 17/148 |

OTHER PUBLICATIONS

Inclan et al., Use of Cumulative Sums of Squares for Retrospective Detection of Changes of Variance, Retrieved on Apr. 3, 2020 at https://rmgsc.cr.usgs.gov/outgoing/threshold_articles/Inclan_Tiao1994.pdf, Journal of the American Statistical Association, vol. 89, No. 427. (Sep. 1994), pp. 913-923, 12 pages.

Killick et al., Optimal detection of changepoints with a linear computational cost, Retrieved on Apr. 3, 2020 at https://arxiv.org/pdf/1101.1438.pdf, (Oct. 10, 2012), 25 pages.

(Continued)

*Primary Examiner* — John H Le
(74) *Attorney, Agent, or Firm* — Lee & Hayes, P.C.

(57) ABSTRACT

The present disclosure provides detecting change of variance points of a target time series based on baseline assumptions of statistical stationarity. A target time series signal is modeled as including a trend component signal and a residual component signal. A signal cost function including at least a difference penalty function and at least one regularization term is optimized for the target signal to output a trend component signal thereof. A signal cost function including at least a difference penalty function and at least one regularization term is optimized for the residual component signal to output estimated variance thereof. Both of these cost functions may be optimized by applying an augmented Lagrangian operator. A centered cumulative sum is computed based on a cumulative sum of the estimated variance. The centered cumulative sum is segmented to yield change of variance points thereof. Such methods may provide improved performance over existing methods.

18 Claims, 9 Drawing Sheets

(56) References Cited

OTHER PUBLICATIONS

Korkas, et al., Multiple Change-Point Detection for Non-Stationary Time Series Using Wild Binary Segementation, retrieved on Apr. 3, 2020, at http://www3.stat.sinica.edu.tw/statistica/oldpdf/A27n114.pdf, Stantistica Sinica (2017), 26 pages.

Wen et al., RobustSTL: A Robust Seasonal-Trend Decomposition Algorithm for Long Time Series, retrieved on Apr. 3, 2020 at https://arxiv.org/abs/1812.01767, Cornell University, (Dec. 5, 2018), 9 pages.

Wen et al., RobustTrend: A Huber Loss with a Combined First and Second Order Difference Regularization for Time Series Trend Filtering, Retrieved on Apr. 3, 2020 at https://arxiv.org/pdf/1906.03751.pdf, Cornell University, (Jun. 27, 2019), 7 pages.

* cited by examiner

400 →

COMPUTE CUMULATIVE SUM FOR ESTIMATED VARIANCE OF RESIDUAL COMPONENT
SIGNAL OVER TIME
402

COMPUTE CENTERED CUMULATIVE SUM BASED ON CUMULATIVE SUM
404

SEGMENT CENTERED CUMULATIVE SUM TO YIELD CHANGE OF VARIANCE POINTS
THEREOF
406

CHANGE OF VARIANCE DETECTION IN TIME SERIES DATA

BACKGROUND

Change point detection is an aspect of the statistical analysis of time series data. Time series data pertaining to events, phenomena, measurements, and the like may be observed over time. Variables observed from time series data may change in value over time; however, such changes may indicate a change in a trend over time, or may merely indicate an outlier value. Various probability distributions as known to persons skilled in the art describe how values of variables in time series data are expected to be distributed as time passes. By observing changes in these probability distributions, change points in the time series data may be more easily identified.

Measures of statistical confidence, such as standard deviation, may also be computed and observed over time in approaches to change point detection. Change of variance detection is an approach of change point detection wherein variance, computed based on standard deviation, is observed over time. Such approaches seek to observe changes in variance, a measure of statistical confidence, over time as an indicator of the occurrence of a change point in trends observed over time. Given a trend of time series data having random values which are expected to fall along a particular probability distribution (such a distribution being generally referred to as a "prior"), variance of the variable over time may be computed from standard deviation based on the probability distribution by established statistical analysis methods. For example, a prior may be a Gaussian distribution (a "Gaussian prior").

Increasingly, time series data and trends thereof are observed from contexts which generate massive quantities of data, such as distributed computing, cloud computing, machine learning, data centers, financial systems, e-commerce transactions, and the like. Time series data and trends thereof may, furthermore, be time-sensitive, meaning that statistical analysis of time-sensitive trends may need to be sufficiently fast to generate actions or actionable outputs on a prompt basis. Thus, there is a need to provide improved change point detection such that change points may be detected promptly as they occur over time, enabling prompt action and responsiveness to the change points.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
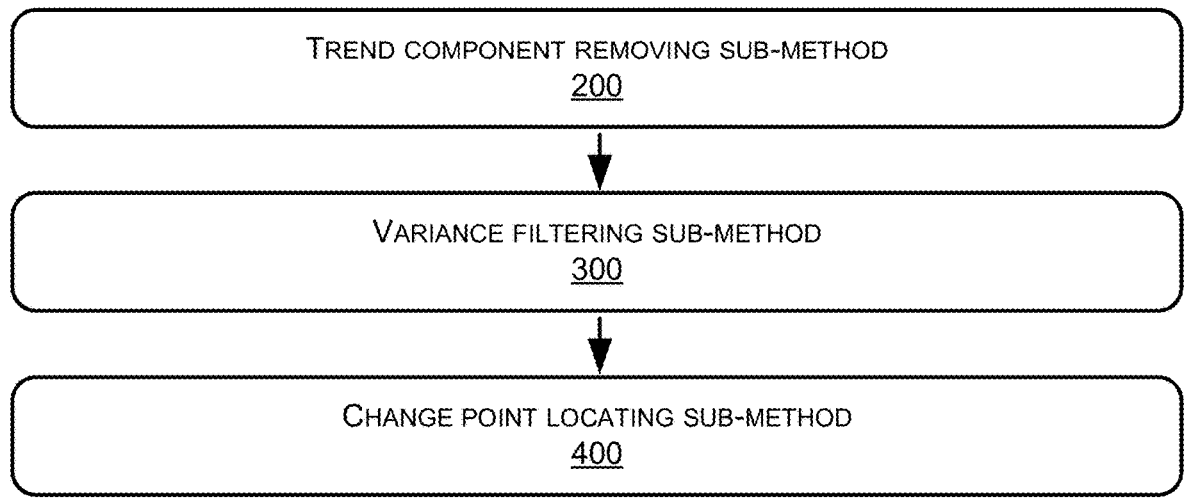
FIG. 1 illustrates a flowchart of a change of variance detection method according to example embodiments of the present disclosure.

Systems and methods discussed herein are directed to implementing a time series trend model, and more specifically implementing data cleaning and sparse regularization of data for a time series model, as well as change of variance detection algorithms for the time series model.

According to example embodiments of the present disclosure, a time series trend model may include a set of equations fitted to observations of values of variables, such as, for example, a regression model. Equations of a time series trend model may be computed based on trends in observed data over time in a target time series, taking time as an independent variable (values of the target time series over time being referenced subsequently as the "target signal"). Modeling of the target signal as a set of equations may assume as a premise that the target signal may be modeled as a sum of at least two components time series: a trend component time series and a residual component time series. Each of the trend component time series and the residual component time series may be a time series of the same length as the target time series. Each of the trend component time series and the residual component time series may individually be further modeled as one or more equations.

A regression model may be, for example, a linear model, wherein variables are modeled as being a linear function of time, based on an expectation that the values of the variables will fall along a Gaussian distribution (a "Gaussian prior"). A regression model may alternatively be, for example, a nonlinear model such as a logarithmic model, an exponential model and the like, without limitation thereto. Regression models may be selected based on a prior of variables of the target time series, which shall not be limited to a Gaussian prior and may include, for example, binomial distributions, Bernoulli distributions, Laplacian distributions and the like, and thus a regression model may be, for example, a generalized linear model based on a given prior.

For example, according to example embodiments of the present disclosure, a target signal $y$ may include values observed over a series of N time periods $\{0, 1, \ldots, N-1\}$, where any time period of substantially equal duration thereto may be referred to generally as a "period" herein. These values may therefore be written as $y = [y_0, y_1, \ldots, y_{N-1}]^T$. The target signal $y$ may thus be modeled as a function of time $t$, where $t$ is any arbitrary period.

According to example embodiments of the present disclosure, the target signal y may be modeled as a function of further component time series, each modeled as a function of time t. The modeled function may, for example, be a sum or weighted sum function over the component time series. A component time series may, like the target signal, include values observed over a series of N time periods.

Component time series may include a trend component time series and a residual component time series. These two component time series represent the assumption that, upon subtracting from values of the target signal over time those components of the target signal attributable to a trend therein over time which may itself be modeled as a function of time (these subtracted components over time being referenced subsequently as the "trend component signal"), a remaining component will be yielded which reflects the influence of noise and outlier values over time (these remaining components over time being referenced subsequently as the "residual component signal").

For example, according to example embodiments of the present disclosure, a trend component signal $\tau$ may be written as $\tau=[\tau_0, \tau_1, \ldots, \tau_{N-1}]^T$, and the trend component signal $\tau$ may be modeled as a function of time t. A residual component signal r may be written as $r=[r_0, r_1, \ldots, r_{N-1}]^T$, and the residual component signal r may be modeled as a function of time t.

Therefore, overall, $y=\tau+r$, and for a time t, $y_t=\tau_t+r_t$.

Each $r_t$ of the residual component signal may further be divided into a noise subcomponent $n_t$ and an outlier subcomponent $a_t$. These subcomponents represent the possibility of neither, one, or both of noise and outliers contributing to observations of the target signal y at time t. Thus each $r_t$ of the residual component signal may be written as $r_t=n_t+a_t$, where either, both, or neither of $n_t$ and $a_t$ may have a zero (in the event that it is modeled as not contributing to the target signal y at time t) or a nonzero value (in the event that it is modeled as contributing to the target signal $\gamma$ at time t) for any given time t.

According to example embodiments of the present disclosure, it is assumed that M change points may be identified in the residual component signal r over time, the M change points representing points along the residual component signal r at which variance $\sigma^2$ (i.e., square of standard deviation) of the residual component signal r changes significantly (definitions of such significant changes, and methodology for detecting such significant changes, shall be given in subsequent passages herein). Based on the assumption of M change points, target signal $\gamma$ may be modeled by a segmented regression model, wherein the overall target time series may be segmented into M+1 time series segments, separated by the M change points. Each of the time series segments may be separately modeled as a time series trend model as described above. Based on this assumption, the M+1 separate time series trend models together may approximate a model of the overall target time series.

In general, starting from the target signal y, removal of the trend component signal $\tau$ is expected to yield the residual component signal r, and removal of the residual component signal r is expected to yield the trend component signal $\tau$. Trend removal and residual removal may serve different purposes with regard to statistical analysis. According to example embodiments of the present disclosure, removal of the trend component signal $\tau$ may transform the target signal y into a segmented statistically stationary time series signal. Statistical stationarity may refer to the signal of the time series having a statistical distribution which does not vary over time, such that measures of statistical confidence such as variance $\sigma^2$ also do not vary over time. Thus, based on such a time series signal, change of variance detection may be facilitated on the basis that variance change should no longer be attributable to trends over time.

Since a trend component signal $\tau$ describes a function which varies over time, the trend component signal $\tau$ may have a statistical distribution, and may have measures of statistical confidence thereof, which vary over time. Removal of the trend component signal $\tau$ from the target signal y may therefore be expected to remove a primary contribution to statistical distribution and measures of statistical confidence of the target signal y varying over time. Thus the remaining component of the target signal $\gamma$ is expected to be substantially less subject to measures of statistical confidence, such as variance $\sigma^2$, thereof varying over time than the original target signal y, though whether the remaining component of the target signal y is exactly statistically stationary is not guaranteed and may depend on the particulars of each modeled time series on a case-by-case basis. For the purpose of example embodiments of the present disclosure, it should be understood that the remaining component of the target signal y may be considered to be approximately and substantially statistically stationary.

Moreover, due to the above assumption that component time series of the target time series include a trend component time series and a residual component time series, the remaining component of the target signal y may be considered to be the residual component signal r.

According to example embodiments of the present disclosure, change point detection, and particularly change of variance detection, assumes a premise that the target time series exhibits statistical stationarity in the absence of any change points. Thus, the removal of the trend component signal $\tau$ is expected to transform the target signal y to conform with this premise, unless change points are present. Conversely, in the event that the target time series still does not exhibit statistical stationarity after trend component signal $\tau$ removal—i.e., variance $\sigma^2$ still changes over time—then change points are present in the target time series.

Example embodiments of the present disclosure provide several methods to performed the above-described change of variance detection method, including, at least, a trend component removing method, a variance filtering method, and a change point locating method.

FIG. 1 illustrates a flowchart of a change of variance detection method 100 according to example embodiments of the present disclosure. The change of variance detection method further includes a trend component removing sub-method 200, a variance filtering sub-method 300, and a change point locating sub-method 400. Each of these sub-methods shall be described in turn henceforth.

Figure 2:
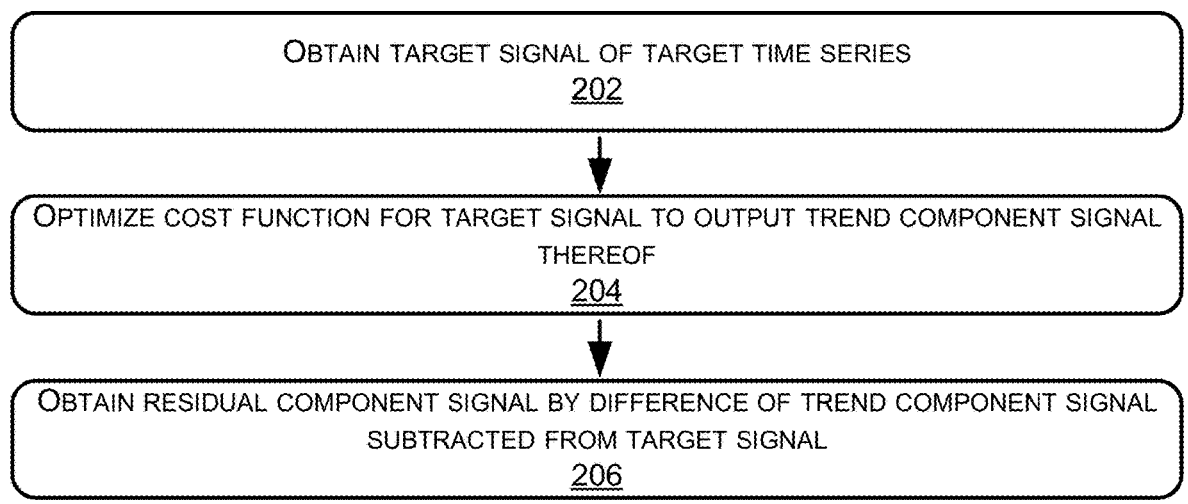
FIG. 2 illustrates a flowchart of a trend component removing sub-method according to example embodiments of the present disclosure.

FIG. 2 illustrates a flowchart of a trend component removing sub-method 200 according to example embodiments of the present disclosure.

At a step 202, a target signal of a target time series is obtained.

According to example embodiments of the present disclosure, the target time series may be any time series having a variable whose value varies over time, as described above. The target signal may be the values of the variable of the time series, as observed over time.

At a step 204, a signal cost function is optimized for the target signal to output a trend component signal thereof, wherein the signal cost function may include at least a difference penalty function and at least one regularization term.

A difference penalty function may generally refer to a loss function which is solved to optimize for a difference of two signals. It is known in the art that a loss function may be any arbitrarily defined function based on an input, where the function performs one or more operations to return an output. (Whereas conventionally "cost function" and "loss function" may be used interchangeably, solely for the purpose of clarity in understanding the present disclosure, "signal cost function" shall be understood as referring to a function which is optimized in step 204, and "loss function" shall be understood as any cost function or loss function in general.) According to example embodiments of the present disclosure, the input of the difference penalty function may be a difference of two signals, particularly a difference of the target signal y less the trend component signal τ. According to example embodiments of the present disclosure, a loss function may be defined to impose a greater penalty on larger differences between the two signals, and a smaller penalty on smaller differences between the two signals. Note that the loss function may be optimized for the trend component signal without knowing the trend component signal.

According to example embodiments of the present disclosure, a loss function may be a Huber loss function, which is conventionally defined as follows:

$$g_\gamma(x_i) = \begin{cases} \frac{1}{2}x_i^2, & |x_i| \leq \gamma \\ \gamma|x_i| - \frac{1}{2}\gamma^2, & |x_i| > \gamma \end{cases}$$

According to a Huber loss function, for a defined threshold y, which should be a relatively small value, the output of the Huber loss function is always positive; is quadratic for inputs between ±y, including 0; is linearly increasing for inputs larger than +y; and is linearly increasing for inputs smaller than −y.

Thus, in the context of a difference penalty function, larger differences between the target signal y and the trend component signal τ (which, according to the time series trend model as described above, is the residual component signal r), whether positive or negative, will incur a greater penalty. Thus, optimizing for the difference penalty function will tend to minimize the residual component signal r across the target time series as much as possible (and as a consequence, maximizing the trend component signal τ across the target time series as much as possible).

According to example embodiments of the present disclosure, the at least one regularization term may serve to reduce influence of trend changes over time. For example, regularization terms may be difference regularization terms, wherein a signal is multiplied by a difference matrix. A regularization term may be a Lasso ($\ell_1$) regularization term, denoted by the operator $\|\ \|_1$. A Lasso regularization term generally includes a regularization parameter multiplied to control magnitude of the regularization term, which may be a hyperparameter λ set arbitrarily and not determined by steps of methods as described herein. The hyperparameter λ may be set according to results of experimentation based on desired strength of the effect of regularization as described herein.

According to example embodiments of the present disclosure, Lasso regularization terms generally output sparse signals wherein most coefficients are zero, reflecting a model which adheres to a Laplacian prior; based on a Laplacian distribution, Lasso regularization terms tend to push small values of a signal to zero. Reasons for sparse output by Lasso regularization terms are generally known to persons skilled in the art and need not be reiterated herein for understanding of the present disclosure. However, due to the sparse property of Lasso regularization output, the regularization effect of each of the regularization terms upon the difference penalty is also sparse. This has been observed to achieve better results than non-sparse regularization terms, in accordance with the following results as given in Table 1 subsequently.

Moreover, the at least one regularization term may be a difference regularization term, wherein the signal is multiplied by a difference matrix wherein off-diagonal coefficients of the matrix tend to be mostly zero values, as described below in more detail.

A difference matrix generally refers to a band matrix having a main diagonal and at least one sub-diagonal or super-diagonal or combinations thereof, with all other coefficients being zero values. Depending on whether the difference matrix is a first-order difference matrix $D^{(1)}$, a second-order difference matrix $D^{(2)}$, or a higher-order difference matrix $D^{(k)}$, the bands and their values may be different. Examples of a first-order difference matrix $D^{(1)}$ and a second-order difference matrix $D^{(2)}$ are given below:

$$D^{(1)} = \begin{bmatrix} 1 & -1 & & & \\ & 1 & -1 & & \\ & & \ddots & & \\ & & & 1 & -1 \end{bmatrix}, D^{(2)} = \begin{bmatrix} 1 & -2 & 1 & & & \\ & 1 & -2 & 1 & & \\ & & & \ddots & & \\ & & & & 1 & -2 & 1 \end{bmatrix}$$

Intuitively, we can apply the k-order (k=1,2, . . . ) difference to measure the k-th difference of a time series. For example, multiplication of a first-order difference matrix with a time series in vector form $[y_1, y_2, \ldots, y_N]$ may cause the signal to be transformed into a difference of each coefficient of the signal with the preceding coefficient: $[y_2-y_1, \ldots, y_N-y_{N-1}]$, which accounts the difference of consecutive entries in the input time series. Multiplication of a second-order difference matrix with a time series in vector form $[y_1, y_2, \ldots, y_N]$ may cause the signal to be transformed into a difference of each coefficient of the signal with the two preceding coefficients: $[y_2-2y_1+y_3, \ldots, y_N-2y_{N-1}+y_{N-2}]$, which accounts the difference of the first-order difference, or the 2-order difference. Both may further reduce contributions of the trend component signal τ over time to the target signal y. Thus, first-order difference regularization terms may incorporate a first-order difference matrix, second-order difference regularization terms may incorporate a second-order difference matrix, and so on (as well as two arbitrarily set regularization hyperparameters λ).

According to example embodiments of the present disclosure, the below signal cost function adds a first-order difference $\ell_1$ regularization term (incorporating a first-order difference matrix) and a second-order difference $\ell_1$ regularization term (incorporating a second-order difference matrix) both to a difference penalty function (which is, herein, a Huber loss function):

$$g_\gamma(y-\tau) + \lambda_1 \|D^{(1)}\tau\|_1 + \lambda_2 \|D^{(2)}\tau\|_1$$

Optimization of the above signal cost function may be written as follows:

$$\hat{\tau} = \min_\tau g_\gamma(y-\tau) + \lambda_1 \|D^{(1)}\tau\|_1 + \lambda_2 \|D^{(2)}\tau\|_1$$

According to example embodiments of the present disclosure, optimizing a cost function such as the example signal cost function described above, without limitation as to the loss function and without limitation as to the one or more regularization parameters, may generally describe executing a regularization filter on the target signal and the trend signal. In particular, the loss function of the regularization filter may be executed on a difference of the target signal y less the trend signal τ. This is expected, according to the time series trend model as described above, to yield the trend component signal alone (written herein as $\hat{\tau}$ for distinction).

At a step 206, a residual component signal is obtained by a difference of the trend component signal subtracted from the target signal.

This step may be simply written as thus:

$$\hat{r} = y - \hat{\tau}$$

Figure 3:
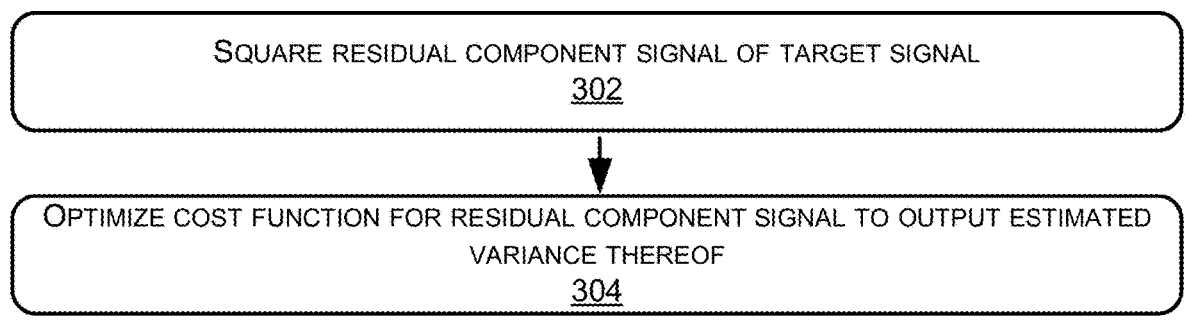
FIG. 3 illustrates a flowchart of a variance filtering sub-method according to example embodiments of the present disclosure.

FIG. 3 illustrates a flowchart of a variance filtering sub-method 300 according to example embodiments of the present disclosure.

At a step 302, a residual component signal of a target signal is squared.

Since variance is, by definition, the square of the standard deviation of a time series, the residual component signal may be normalized for modeling a linear relation to its variance by squaring the residual component signal. The residual component signal, represented as a vector, may be squared by squaring each of its coefficients. Thus, the squared residual component signal, represented herein as s, may be derived as follows:

$$s = [s_0, s_1, \ldots, s_{N-1}]^T = [\hat{r}_0^2, \hat{r}_1^2, \ldots, \hat{r}_{N-1}^2]^T$$

At a step 304, a signal cost function is optimized for the squared residual component signal to output estimated variance thereof, wherein the signal cost function may include at least a difference penalty function and at least one regularization term.

In accordance with rationales as given above, the residual component signal over time, as well as its square, is expected to exhibit statistical stationarity in the absence of any change points. However, according to example embodiments of the present disclosure, without actual measures of statistical confidence of the residual component signal, the variance of the residual component signal cannot be directly measured and should be estimated. In particular, the square s of the residual component signal may be modeled as a linear relation with the variance v of the residual component signal.

Persons skilled in the art will appreciate that variance estimation for a regression model (where coefficients of the model are not known, such as in the change of variance context as discussed herein) is generally an open-ended problem in the art, and a variety of computational methods are known. For example, one type of variance estimation method, or "estimator" for short, is Lasso estimators, which, as described above with reference to Lasso regularization terms, may further include a hyperparameter $\lambda_3$. The Lasso estimator may be applied to variance estimation for a residual component signal due to expected sparsity of the residual component signal; the residual component signal is expected to be sparse, as a consequence of the Lasso regularization terms of the trend component removing sub-method 200 as described above, and so for reasons similar to those described above the Lasso estimator may also be applied thereto.

A known Lasso estimator as applied to the linear relation between the square s of the residual component signal and the variance v of the residual component signal may, for example, have the general form:

$$\|s - v\|_2^2 + \lambda_3 \|D^{(1)} v\|_1$$

Herein, the operator $\|\ \|_2^2$ is a $\ell_2$ loss term, and the operator $\|\ \|_1$ is a $\ell_1$ regularization term. However, it is generally understood that $\ell_2$ loss adheres to a Gaussian prior. $\ell_2$ loss, consequently, will not be robust to outliers within the residual component signal. Thus, according to example embodiments of the present disclosure, the $\ell_2$ loss term of the general Lasso estimator may be replaced by another term.

According to example embodiments of the present disclosure, the $\ell_2$ loss term of the general Lasso estimator may be replaced by a Huber loss function. Since the Huber loss function, as described above, is linear for large input instead of quadratic as that of $\ell_2$ loss, the Huber loss function tends to mitigates the loss incurred by large input, complementing a Laplacian prior rather than a Gaussian prior. This has been observed to achieve better results than the $\ell_2$ loss term, in accordance with the following results as given in Table 1 subsequently.

Performance of each method is measured based on relaxed precision, recall, and F1 score (where scores closer to 1 correlate with better performance in each case).

| Method | Precision | Recall | F1 score |
| --- | --- | --- | --- |
| Present method (Huber loss + $\ell_1$ regularization) | 0.91 | 0.88 | 0.89 |
| $\ell_2$ loss + $\ell_1$ regularization | 0.74 | 0.71 | 0.72 |
| $\ell_2$ loss + $\ell_2$ regularization | 0.41 | 0.53 | 0.45 |

It may be seen that performance degrades both in the presence of the $\ell_2$ regularization term and in the absence of the Huber loss function.

Thus, a Lasso estimator according to example embodiments of the present disclosure may be updated as the following form:

$$g_\gamma(s - v) + \lambda_3 \|D^{(1)} v\|_1$$

Optimization of the above signal cost function may be written as follows:

$$\hat{v} = \min_v g_\gamma(s - v) + \lambda_3 \|D^{(1)} v\|_1$$

According to example embodiments of the present disclosure, optimizing a signal cost function such as the example signal cost function described above, may generally describe a variance estimator estimating variance of the squared residual component signal over time. In particular, the loss function of the regularization filter may be executed on a difference of the square s of the residual component signal less the variance v thereof. This is expected, according to the modeled linear equation therebetween as described above, to yield a variance estimate as a time series (written herein as $\hat{v}$ for distinction, and defined below).

$$\hat{v} = [\hat{v}_0, \hat{v}_1, \ldots, \hat{v}_{N-1}]^T = [\hat{\sigma}_0^2, \hat{\sigma}_1^2, \ldots, \hat{\sigma}_{N-1}^2]^T$$

Example embodiments of the present disclosure further provide an augmented Lagrangian function operative to optimize either or both of the above-mentioned signal cost functions.

The above-mentioned signal cost functions may be optimized by operation of known optimization algorithms such as gradient descent or proximal gradient, as known to persons skilled in the art. However, according to example embodiments of the present disclosure, due to the multiple constraints of the signal cost functions therein, instead of optimizing the signal cost functions, an augmented Lagrangian method may instead be optimized, wherein each of the constraints is rewritten as a penalty term of the signal cost function, resulting in an augmented Lagrangian function. Moreover, the augmented Lagrangian function may be solved by an alternating direction method of multipliers ("ADMM") method, wherein the augmented Lagrangian function is, in alternating iterations, solved for minimizing one parameter while holding the other parameters. The ADMM method may further be a majorization-minorization based method ("MM-ADMM").

First, both of the above-mentioned signal cost functions may be rewritten in the following form:

$$\min_{\tau} g_Y(a-b) + \|z\|_1,$$
$$s.t. \quad D\tau = z$$

The above formulation may be made equivalent to the signal cost function of the trend component removing sub-method 200 by setting $a=y$, $b=\tau$, and $D=[\lambda_1 D^{(1)T}, \lambda_2 D^{(2)T}]^T$. The above formulation may be made equivalent to the signal cost function of the variance filtering sub-method 300 by setting $a=s$, $b=v$, and $D=\lambda_3 D^{(1)}$.

According to example embodiments of the present disclosure, the augmented Lagrangian function may have the form $\mathcal{L}_\rho(b, z, u)$ as written below, formulated using the additional dual variable $u \in \mathbb{R}$ and the penalty term $\rho$. The augmented Lagrangian function may be alternatingly solved for b while holding each other parameter constant (then updating each variable), and solved for z while holding each other parameter constant (then updating each variable):

$$\mathcal{L}_\rho(b, z, u) = g_Y(a-b) + \|z\|_1 + u^T(Db-z) + \frac{\rho}{2}\|Db-z\|_2^2$$

According to an MM-ADMM method, the augmented Lagrangian function may be optimized by the following iterative steps applied analogously for both of the above signal cost functions:

$$b^{k+1}=y-\rho(A+\rho D^T D)^{-1}D^T(u^k-z^k+Dy) \quad z^{k+1}=S_\rho(Db^{k+1}+u^k) \quad u^{k+1}=u^k+Db^{k+1}-z^{k+1}$$

That is, first, $b^{k+1}$ is solved while holding $u^k$ and $z^k$ constant; then, $z^{k+1}$ is solved while holding $b^{k+1}$ and $u^k$ constant; and then, $u^{k+1}$ is solved while holding $b^{k+1}$ and $z^{k+1}$ constant.

The iterative steps further include a matrix A. According to example embodiments of the present disclosure, A may be solved as follows:

$$A=\text{diag}(g_Y'(a^k-b^k))\text{diag}^{-1}(g_Y'(a^k-b^k))$$

The iterative steps further include a soft thresholding operator $S_\rho(x)$. According to example embodiments of the present disclosure, $S_\rho(x)$ may be solved as follows:

$$S_\rho(x)=(1-\rho/|x|)_+ x$$

Figure 4:
FIG. 4 illustrates a flowchart of a change point locating sub-method according to example embodiments of the present disclosure.
Figure 4:

FIG. 4 illustrates a flowchart of a change point locating sub-method 400 according to example embodiments of the present disclosure.

At a step 402, a cumulative sum is computed for the estimated variance of the residual component signal over time.

A cumulative sum ("CUSUM") in the context of example embodiments of the present disclosure generally refers to, for a time series, summing, for each time k over a series of N time periods $\{0, 1, \ldots, N-1\}$, the values of the time series up to each time. Each of these sums makes up a new time series, $C=\{C_0, C_1, \ldots, C_{N-1}\}$, where $C_k=\Sigma_{t=0}^k \hat{\sigma}_t^2$. $C_k$ is expected to always increase over time, and increase more significantly at each statistically significant deviation along the target signal y from the expectation of statistical stationarity.

Conventionally, CUSUMs may be used in change point detection by detecting when the value of the CUSUM time series passes a threshold. However, because change of variance detection is based on statistically significant changes rather than absolute threshold values, this approach is not suitable for CUSUMs according to example embodiments of the present disclosure. Furthermore, multiple changes of variance are expected to be detected, which further renders the use of absolute threshold values inappropriate.

At a step 404, a centered cumulative sum is computed based on the cumulative sum.

According to example embodiments of the present disclosure, a CUSUM time series $C_k$ may further be centered to yield a centered CUSUM time series $C'_k$. "Centering" is a computation according to example embodiments of the present disclosure, defined by the below equation:

$$C'_k = \frac{C_k}{C_{N-1}} - \frac{k+1}{N}, k = 0, 1, \ldots, N-1$$

According to example embodiments of the present disclosure, over times wherein the residual component signal exhibits statistically significant changes in variance (in contrast to expectations of statistical stationarity), the centered CUSUM tends to increase over time due to the first term of the centered CUSUM increasing at a comparatively greater rate over time than the second term of the centered CUSUM. However, over times wherein the residual component signal does not exhibit statistically significant changes in variance (in accordance with expectations of statistical stationarity), the centered CUSUM tends to decrease over time due to the second term of the centered CUSUM increasing at a comparatively greater rate over time than the first term of the centered CUSUM.

Thus, whereas the CUSUM time series always increases over time, the centered CUSUM time series may exhibit oscillation between increasing and decreasing over time in near piecewise linear segments, changing from one trend to the other trend at change points of variance. The linear nature of the piecewise segments facilitates points of change between increasing and decreasing trends being identified as change points of variance.

At a step 406, the centered cumulative sum is segmented to yield change of variance points thereof.

It should be understood that, with regard to a time series, various methods exist to detect various events which may occur along the time series so as to demarcate edges of distinct segments therebetween, or to detect various piecewise trends along segments the time series and distinguish them from piecewise trends along other segments. For the purpose of example embodiments of the present disclosure, methods to segment a time series, whether by detecting events which demarcate edges of distinct segments or by detecting piecewise segments themselves, may be referred to as "segmenting."

For example, according to example embodiments of the present disclosure, segmenting may be performed by a breakpoint detection method as known to persons skilled in the art.

Breakpoints, in the context of time series, may refer to a point along the time series where an abrupt change occurs. A "change" may be defined as a change in any observable metric of the time series, such as a statistical distribution or any other suitable metric over time as known to persons skilled in the art; breakpoint detection, therefore, may encompass detection methods based in detecting abrupt changes in any such suitable metric over time along the time series.

For example, according to example embodiments of the present disclosure, segmenting may be performed by a peak and/or valley detection method as known to persons skilled in the art.

Peaks and valleys, in the context of time series, may refer to points along the time series which are, respectively, local maxima and local minima. As with breakpoints, peaks and valleys may represent abrupt changes along a time series. Peak and/or valley detection, therefore, may encompass detection methods based in detecting local maxima and local minima over time along the time series.

For example, according to example embodiments of the present disclosure, segmenting may be performed by a piecewise regression method as known to persons skilled in the art.

A piecewise regression method may refer to various regression methods which model a time series as multiple separate segmented time series separated at various points. For example, a piecewise regression method may, as described above with regard to breakpoint detection methods, detect breakpoints and reference detected breakpoints as edges of each individually modeled segment. Alternatively, a piecewise regression may model arbitrary segments of the time series and combine these arbitrary segments to verify segments, then demarcate edges between verified segments as breakpoints. By either manner or any other manner as known to persons skilled in the art, piecewise regression methods may result in the centered cumulative sum time series being segmented.

Ultimately, the points where abrupt change occurs, regardless of manners of detection, may be yielded by change point locating sub-methods 400 as described herein as change of variance points.

Example embodiments of the present disclosure may be implemented on server hosts and computing hosts. Server hosts may be any suitable networked server, such as cloud computing systems, which may provide collections of servers hosting computing resources such as a database containing time series data. Computing hosts such as data centers may host time series trend models according to example embodiments of the present disclosure to perform change of variance detection methods.

A cloud computing system may connect to various end devices which users may operate to collect time series data, organize data, set parameters, and run the time series trend model to perform change of variance detection. End devices may connect to the server hosts through one or more networks, such as edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

Figure 5A:
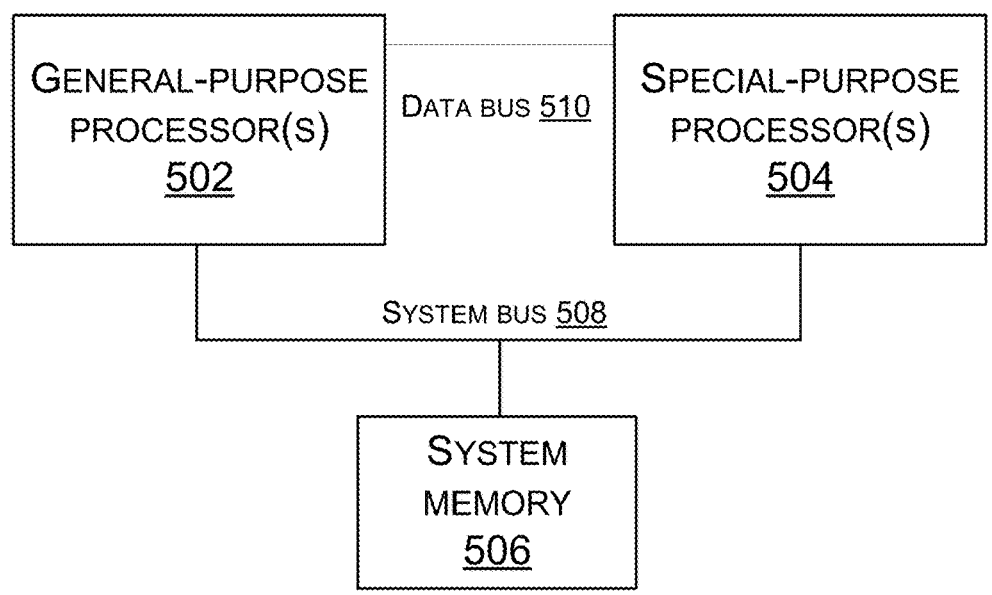
FIGS. 5A and 5B illustrate a system architecture of a system configured to compute change of variance detection according to example embodiments of the present disclosure.
Figure 5B:
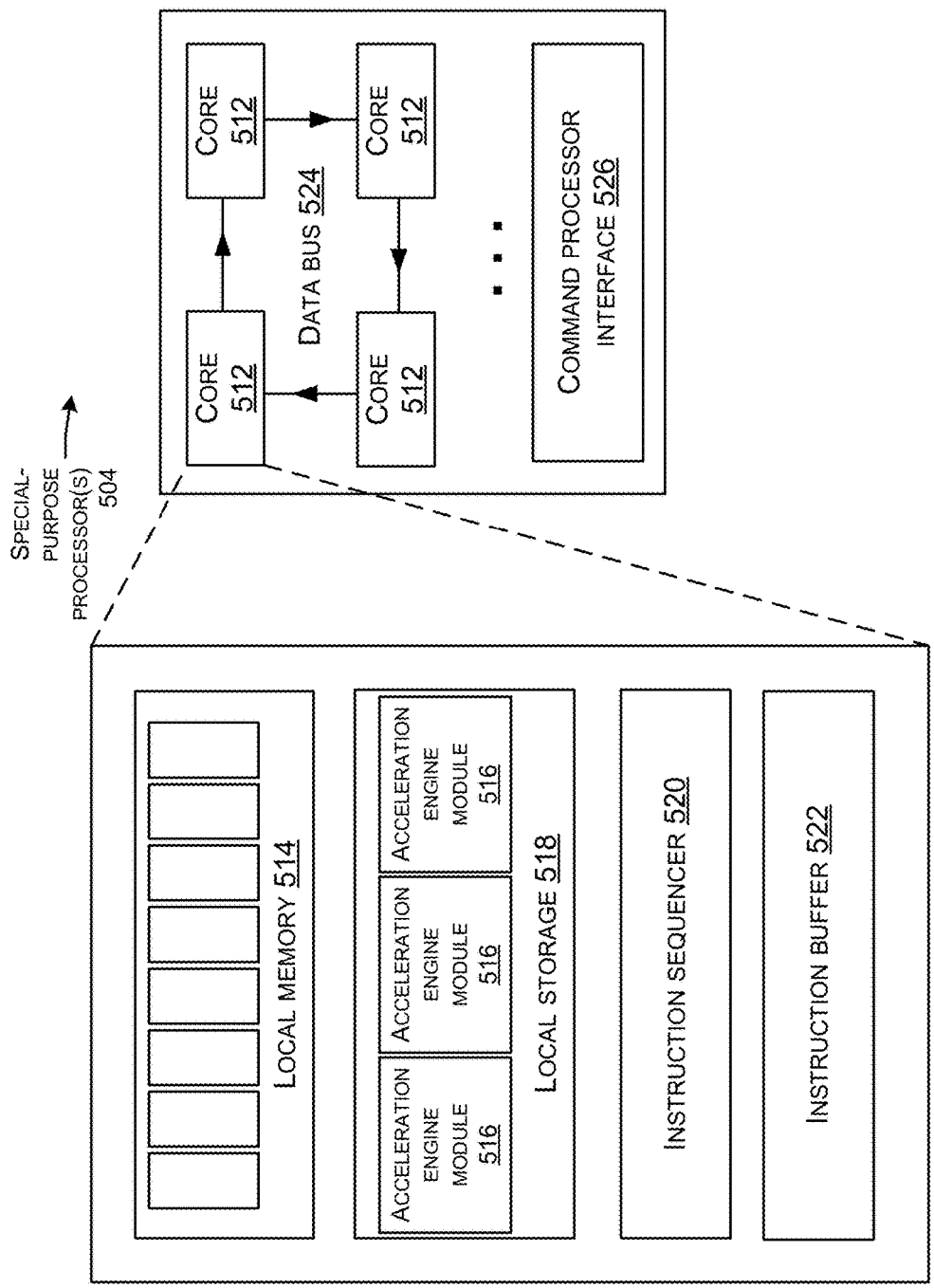

FIGS. 5A and 5B illustrate a system architecture of a system 500 configured to compute change of variance detection according to example embodiments of the present disclosure.

A system 500 according to example embodiments of the present disclosure may include one or more general-purpose processor(s) 502 and one or more special-purpose processor(s) 504. The general-purpose processor(s) 502 and special-purpose processor(s) 504 may be physical or may be virtualized and/or distributed. The general-purpose processor(s) 502 and special-purpose processor(s) 504 may execute one or more instructions stored on a computer-readable storage medium as described below to cause the general-purpose processor(s) 502 or special-purpose processor(s) 504 to perform a variety of functions. Special-purpose processor(s) 504 may be computing devices having hardware or software elements facilitating computation of neural network computing tasks such as training and inference computations. For example, special-purpose processor(s) 504 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as matrix multiplication, special-purpose processor(s) 504 may, for example, implement engines operative to compute mathematical operations such as matrix operations and vector operations.

A system 500 may further include a system memory 506 communicatively coupled to the general-purpose processor(s) 502 and the special-purpose processor(s) 504 by a system bus 508. The system memory 506 may be physical or may be virtualized and/or distributed. Depending on the exact configuration and type of the system 500, the system memory 506 may be volatile, such as RAM, non-volatile, such as ROM, flash memory, miniature hard drive, memory card, and the like, or some combination thereof.

The system bus 508 may transport data between the general-purpose processor(s) 502 and the system memory 506, between the special-purpose processor(s) 504 and the system memory 506, and between the general-purpose processor(s) 502 and the special-purpose processor(s) 504. Furthermore, a data bus 510 may transport data between the general-purpose processor(s) 502 and the special-purpose processor(s) 504. The data bus 510 may, for example, be a Peripheral Component Interconnect Express ("PCIe") connection, a Coherent Accelerator Processor Interface ("CAPI") connection, and the like.

FIG. 5B illustrates an example of special-purpose processor(s) 504, including any number of core(s) 512. Processing power of the special-purpose processor(s) 504 may be distributed among the core(s) 512. Each core 512 may include local memory 514, which may contain pre-initialized data, such as model parameters, or data structures, such as constant buffers for batch normalization or quantization, for the performance of special-purpose computing. Each core 512 may further be configured to execute one or more sets of computer-executable acceleration engine modules 516 pre-initialized on local storage 518 of the core 512, which may each be executable by the core(s) 512, including execution in parallel by multiple core(s) 512, to perform or accelerate, for example, arithmetic operations such as matrix multiplication or matrix transposition, function operations, or specially defined operations such as optimizing an augmented Lagrangian operator by MM-ADMM as described herein. Each core 512 may further include an instruction sequencer 520, which receives and orders instructions received from an instruction buffer 522. Some number of core(s) 512, such as four, may be in communication by a data bus 524, such as a unidirectional ring bus. Software drivers controlling operation of each core 512 may control the core(s) 512 and synchronize their operations by sending executable commands through a command processor interface 526.

Data series may be transported to special-purpose processor(s) 504 over a system bus 508 or a data bus 510, where change of variance detection may be performed by the special-purpose processor(s) 504 on the data series as described herein, and output change of variance points as described herein.

Thus, example embodiments of the present disclosure provide detecting change of variance points of a target time series based on baseline assumptions of statistical stationarity. Example embodiments of the present disclosure provide removing trend component signal from the target signal and regularizing the remaining residual component signal using sparse regularization terms. Example embodiments of the present disclosure further provide an augmented Lagrangian operator and an MM-ADMM method for performing both aforementioned functions. Example embodiments of the present disclosure further provide computing a centered cumulative sum from the residual component signal and determining change of variance points therefrom. The application of sparse regularization terms and centered cumulative summing, for example, have been experimentally determined to yield superior outputs compared to known techniques.

Change of variance points output by detection methods applied to time series trend models according to example embodiments of the present disclosure may be applied to practical problems such as monitoring distributed computing, cloud computing, machine learning, data centers, financial systems, e-commerce transactions, and the like.

Figure 6:
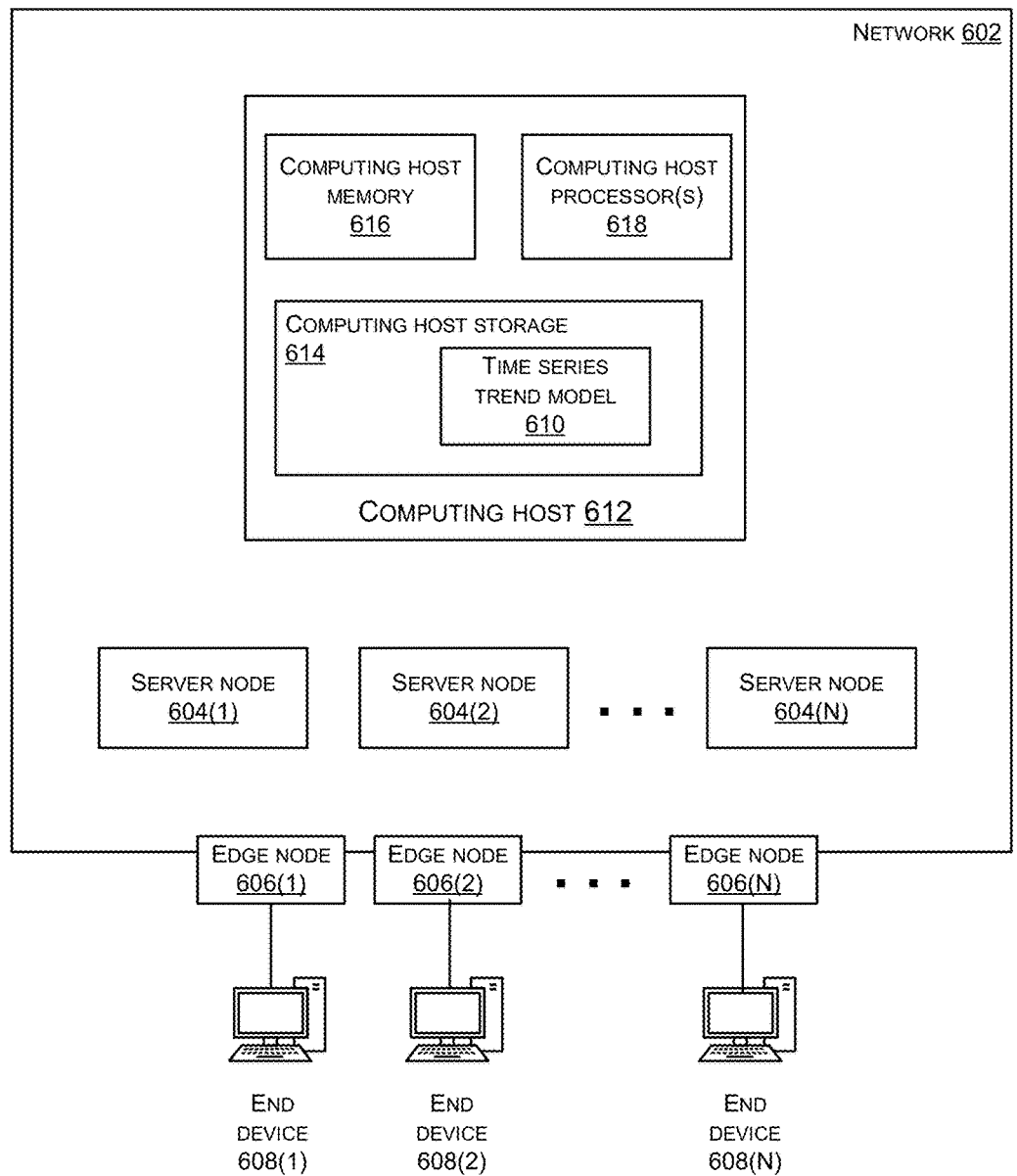
FIG. 6 illustrates an architectural diagram of server host(s) and a computing host for computing resources and a time series trend model according to example embodiments of the present disclosure.

FIG. 6 illustrates an architectural diagram of server host(s) 600 and a computing host for computing resources and a time series trend model according to example embodiments of the present disclosure. As described above, according to example embodiments of the present disclosure, a cloud computing system may be operative to provide server host functionality for hosting computing resources, supported by a computing host such as a data center hosting a time series trend model. Thus, this figure illustrates some possible architectural embodiments of computing devices as described above.

The server host(s) 600 may be implemented over a network 602 of physical or virtual server nodes 604(1), 604(2), . . . , 604(N) (where any unspecified server node may be referred to as a server node 604) connected by physical or virtual network connections. Furthermore, the network 602 terminates at physical or virtual edge nodes 606(1), 606(2), . . . , 606(N) (where any unspecified edge node may be referred to as an edge node 606) located at physical and/or logical edges of the network 602. The edge nodes 606(1) to 606(N) may connect to any number of end devices 608(1), 608(2), . . . , 608(N) (where any unspecified end device may be referred to as an end device 608).

A time series trend model 610 implemented on a computing host accessed through an interface of the server host(s) 600 as described in example embodiments of the present disclosure may be stored on physical or virtual storage of a computing host 612 ("computing host storage 614"), and may be loaded into physical or virtual memory of the computing host 612 ("computing host memory 616") in order for one or more physical or virtual processor(s) of the computing host 612 ("computing host processor(s) 618") to perform computations using the time series trend model 610 to compute time series data related to optimization as described herein. Computing host processor(s) 618 may be special-purpose computing devices facilitating computation of matrix arithmetic computing tasks. For example, computing host processor(s) 618 may be one or more special-purpose processor(s) 504 as described above, including accelerator(s) such as Neural Network Processing Units ("NPUs"), Graphics Processing Units ("GPUs"), Tensor Processing Units ("TPU"), and the like.

According to example embodiments of the present disclosure, different modules of a time series trend model as described below with reference to FIG. 7 may be executed by different processors of the computing host processor(s) 618 or may execute by a same processor of the computing host processor(s) 618 on different cores or different threads, and each module may perform computation concurrently relative to each other submodule.

Figure 7:
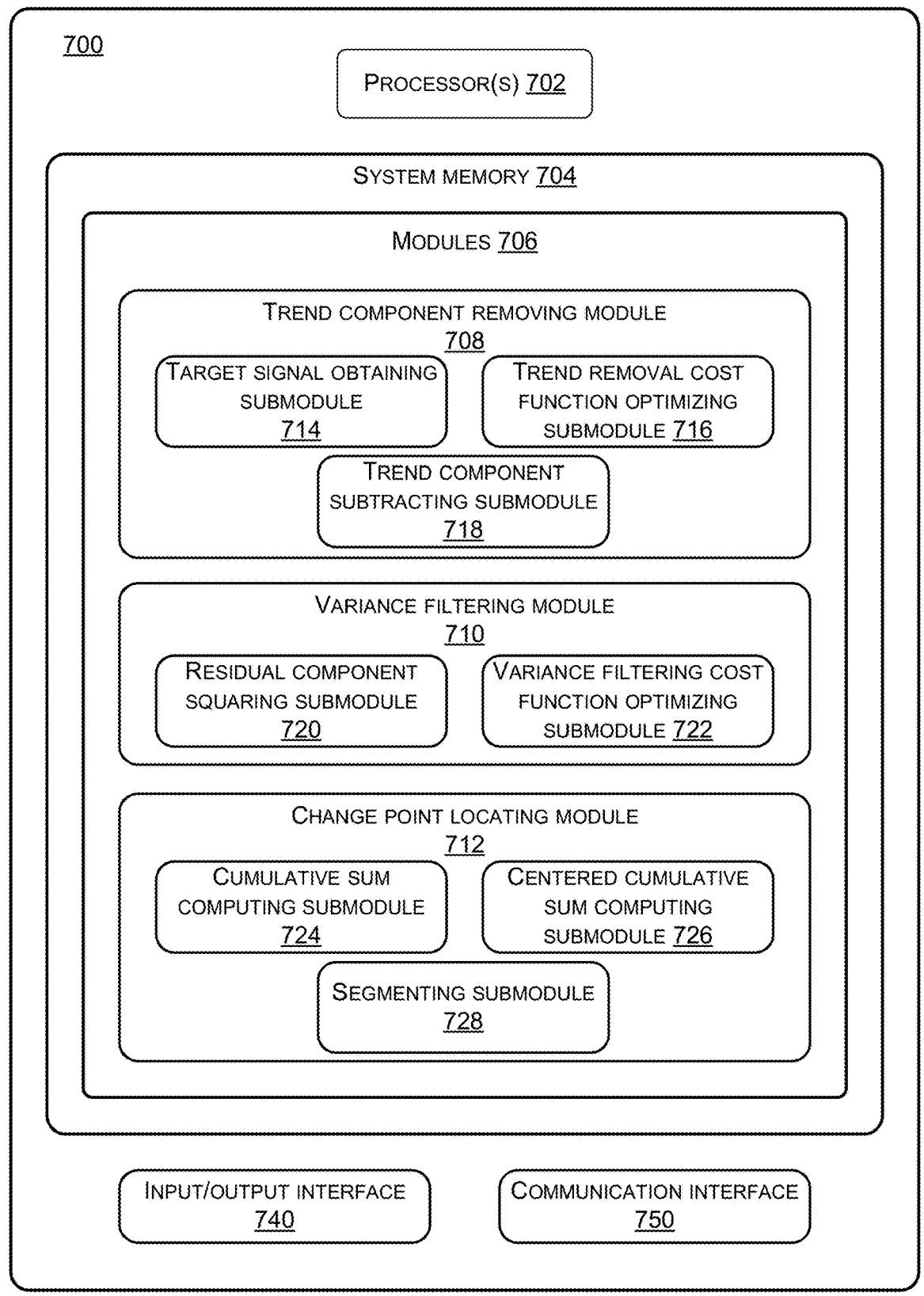
FIG. 7 illustrates an example computing system for implementing the processes and methods described herein for implementing change of variance detection.

FIG. 7 illustrates an example computing system 700 for implementing the processes and methods described above for implementing change of variance detection.

The techniques and mechanisms described herein may be implemented by multiple instances of the computing system 700, as well as by any other computing device, system, and/or environment. The computing system 700 may be any varieties of computing devices, such as personal computers, personal tablets, mobile devices, other such computing devices operative to perform matrix arithmetic computations. The computing system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 and system memory 704 may be physical or may be virtualized and/or distributed. The processor(s) 702 may execute one or more modules and/or processes to cause the processor(s) 702 to perform a variety of functions. In embodiments, the processor(s) 702 may include a central processing unit ("CPU"), a GPU, an NPU, a TPU, any combinations thereof, or other processing units or components known in the art. Additionally, each of the processor(s) 702 may possess its own local memory, which also may store program modules, program data, and/or one or more operating systems.

Depending on the exact configuration and type of the computing system 700, the system memory 704 may be volatile, such as RAM, non-volatile, such as ROM, flash memory, miniature hard drive, memory card, and the like, or some combination thereof. The system memory 704 may include one or more computer-executable modules 706 that are executable by the processor(s) 702. The modules 706 may be hosted on a network as services for a data processing platform, which may be implemented on a separate system from the computing system 700.

The modules 706 may include, but are not limited to, a trend component removing module 708, a variance filtering module 710, and a change point locating module 712. The trend component removing module 708 may further include a target signal obtaining submodule 714, a trend removal cost function optimizing submodule 716, and a trend component subtracting submodule 718. The variance filtering module 710 may further include a residual component squaring submodule 720 and a variance filtering cost function optimizing submodule 722. The change point locating module 712 may further include a cumulative sum computing submodule 724, a centered cumulative sum computing submodule 726, and a segmenting submodule 728.

The target signal obtaining submodule 714 may be configured to obtain a target signal of a target time series as described above with reference to step 202.

The trend removal cost function optimizing submodule 716 may be configured to optimize a signal cost function for the target signal to output a trend component signal thereof as described above with reference to step 204.

The trend component subtracting submodule 718 may be configured to subtract the trend component signal from the target signal to obtain a residual component signal thereof as described above with reference to step 206.

The residual component squaring submodule 720 may be configured to square a residual component signal of a target signal as described above with reference to step 302.

The variance filtering cost function optimizing submodule 722 may be configured to optimize a signal cost function for the residual component signal to output estimated variance thereof as described above with reference to step 304.

The cumulative sum computing submodule 724 may be configured to compute a cumulative sum for the estimated variance of the residual component signal over time as described above with reference to step 402.

The centered cumulative sum computing submodule 726 may be configured to compute a centered cumulative sum based on the cumulative sum as described above with reference to step 404.

The segmenting module 728 may be configured to segment the centered cumulative sum to yield change of variance points thereof as described above with reference to step 406.

The system 700 may additionally include an input/output ("I/O") interface 740 and a communication module 750 allowing the system 700 to communicate with other systems and devices over a network, such as server host(s) as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Performance of change of variance detection according to example embodiments of the present disclosure is measured against several change of variance detection methods as known in the art implemented in the libraries of R, an industry standard statistical analysis software development tool. The methods are implemented in the changepoint ("cpt") library of R (called by function calls to "cpt.var"), and in the multiple change point detection ("wbs") library of R (called by function calls to "wbs"). These include:

The Pruned Exact Linear Time ("PELT") algorithm, as proposed by Killick, Fearnhead, and Eckley;

The Cumulative Sum of Squares ("CSS") algorithm, as proposed by Inclan and Tiao; and The Wild Binary Segmentation ("wbs.lsw") algorithm, as proposed by Korkas and Fryzlewiez.

Synthetic time series datasets were generated to each include 1600 data points, with randomly generated noise, multiple randomly generated outliers, and trends exhibiting non-stationarity such that variance changes three times per time series. Examples of synthetic time series are illustrated in FIGS. 8A through 8D.

Figure 8A:
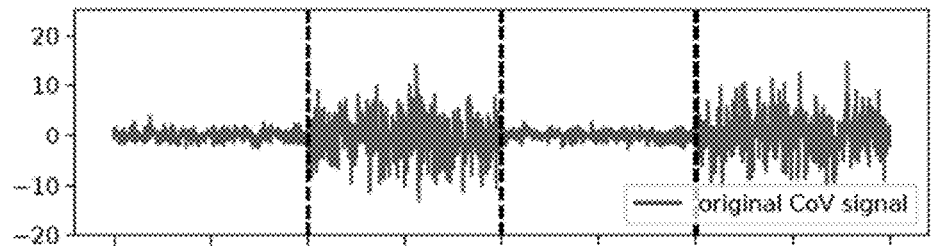
FIGS. 8A through 8D illustrate examples of synthetic time series dataset generated with randomly generated noise, multiple randomly generated outliers, and trends exhibiting non-stationarity.

FIG. 8A illustrates a synthetic signal generated having three changes in variance (illustrated with vertical broken lines) and noise, but no outliers and with trends exhibiting stationarity.

Figure 8B:
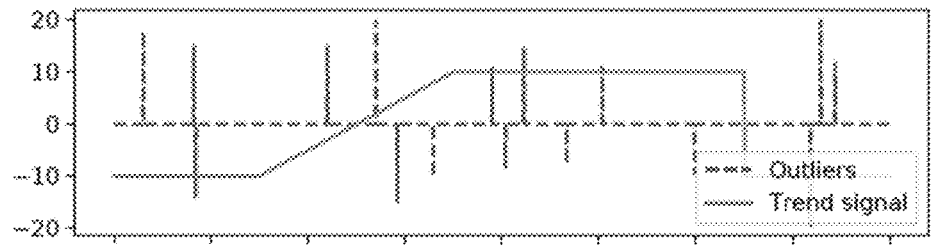

FIG. 8B illustrates randomly generated outliers and a non-stationary trend signal generated for insertion into the signal of FIG. 8A.

Figure 8C:
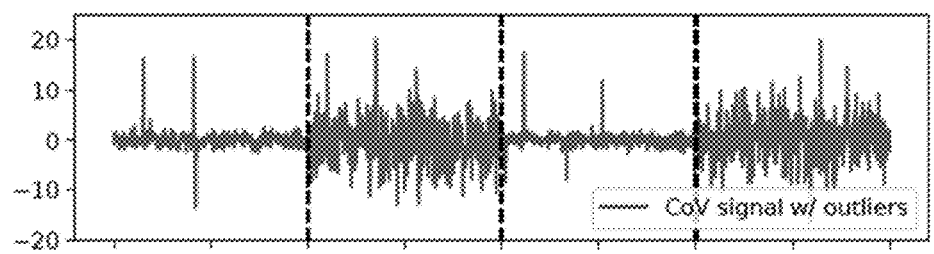

FIG. 8C illustrates the signal of FIG. 8A after the outliers of FIG. 8B are inserted.

Figure 8D:
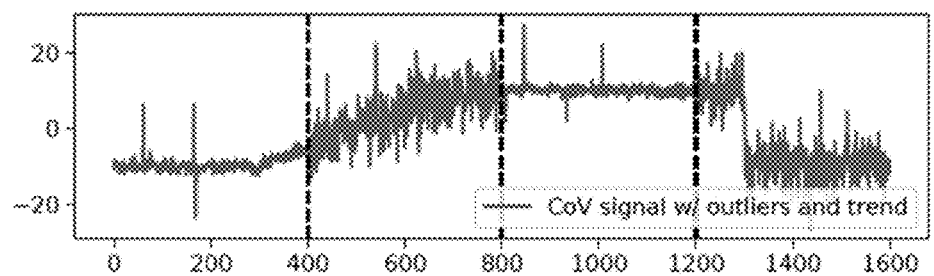

FIG. 8D illustrates the signal of FIG. 8C after the trend signal of FIG. 8B is inserted.

Performance of each model is measured based on relaxed precision ("pr"), recall ("re"), and F1 score ("f1"), given in Table 2 below (where scores closer to 1 correlate with better performance in each case).

| Outlier Ratio | Outlier Ratio = 0 | | | | | | Outlier Ratio = 0.01 | | | | | |
|---|---|---|---|---|---|---|---|---|---|---|---|---|
| Trend Signal | Without Trend | | | With Trend | | | Without Trend | | | With Trend | | |
| Metric[3] | pr | re | f1 | pr | re | f1 | pr | re | f1 | pr | re | f1 |
| cpt.var (PLET) | 0.99 | 1.00 | 1.00 | 0.01 | 0.01 | 0.01 | 0.22 | 0.97 | 0.36 | 0.02 | 0.01 | 0.01 |
| cpt.var (CSS) | 0.91 | 0.94 | 0.92 | 0 | 0 | 0 | 0.39 | 0.81 | 0.51 | 0 | 0 | 0 |
| wbs.lsw | 0.91 | 0.91 | 0.91 | 0.81 | 0.90 | 0.85 | 0.36 | 0.65 | 0.46 | 0.35 | 0.66 | 0.45 |
| Proposed Robust-CoV | 0.98 | 0.98 | 0.98 | 0.97 | 0.97 | 0.97 | 0.94 | 0.94 | 0.94 | 0.91 | 0.88 | 0.89 |

It may be seen that where outliers, trend signal, and both outliers and trend signal are added to the synthetic signal, the change of variance detection method according to example embodiments of the present disclosure ("Proposed Robust-CoV") generally outperforms each other method. In particular, where the trend signal is added, the method according to example embodiments of the present disclosure substantially outperforms PLET and CSS due to the performance of trend removal and sparse regularization. Moreover, though wbs.lsw performs better than both PLET and CSS in those cases, the method according to example embodiments of the present disclosure still outperforms wbs.lsw due to the performance of segmentation after centered cumulative sums, which is absent from each of the known methods.

Furthermore, a dataset as published in 2015 by Laptev, Amizadeh, and Flint of Yahoo! was also used to test each of the methods. In this case, since the true change of variance points are known, Table 3 below gives each respective method's detection of change of variance points against the true change of variance points (where the detected points closest to the true points are highlighted, where applicable).

| True change points | [419, 1259] |
| cpt.var (PLET) | [247, 672, 1177, 1464] |
| cpt.var (PLET) w/RobustTrend | [55, 426, 1259, 1633] |
| cpt.var (CSS) | [114, 282, 528, 865, 1177] |
| cpt.var (CSS) w/RobustTrend | [426, 1255, 1633] |
| wbs.lsw | [422, 529, 1256] |
| wbs.lsw w/RobustTrend | [422, 529, 1256] |
| Proposed Robust-CoV | [422, 1258] |

Again, it may be seen that the method according to example embodiments of the present disclosure performs best.

By the abovementioned technical solutions, the present disclosure provides detecting change of variance points of a target time series based on baseline assumptions of statistical stationarity. A target time series signal is modeled as including a trend component signal and a residual component signal. A signal cost function including at least a difference penalty function and at least one regularization term is optimized for the target signal to output a trend component signal thereof. A signal cost function including at least a difference penalty function and at least one regularization term is optimized for the residual component signal to output estimated variance thereof. Both of these signal cost functions may be optimized by optimizing an augmented Lagrangian operator. A centered cumulative sum is computed based on a cumulative sum of the estimated variance. The centered cumulative sum is segmented to yield change of variance points thereof. Methods of the present disclosure provide improved performance over existing methods due to at least trend component signal removal and sparse regularization terms utilized in optimizing the signal cost functions, and segmentation of the centered cumulative sum to directly detect change of variance points.

EXAMPLE CLAUSES

A. A method comprising: optimizing a variance filter signal cost function for a residual component signal of a target signal of a time series to output estimated variance thereof; computing a centered cumulative sum of the estimated variance of the residual component signal over time; and segmenting the centered cumulative sum to yield one or more change of variance points of the target signal.

B. The method as paragraph A recites, further comprising optimizing a trend removal signal cost function for the target signal to output a trend component signal thereof; wherein the residual component signal is obtained by a difference of the trend component signal subtracted from the target signal.

C. The method as paragraph B recites, wherein the residual component signal is obtained by further squaring the difference of the trend component signal subtracted from the target signal.

D. The method as paragraph B recites, wherein the trend removal signal cost function and the variance filter signal cost function each comprises, respectively, at least a difference penalty function and at least one regularization term.

E. The method as paragraph D recites, wherein each respective difference penalty function comprises a Huber loss function.

F. The method as paragraph D recites, wherein each respective at least one regularization term comprises a sparse regularization term.

G. The method as paragraph B recites, wherein optimizing the trend removal signal cost function and optimizing the variance filter signal cost function, respectively, each comprises optimizing an augmented Lagrangian operator.

H. A system comprising: one or more processors; and memory communicatively coupled to the one or more processors, the memory storing computer-executable modules executable by the one or more processors that, when executed by the one or more processors, perform associated operations, the computer-executable modules comprising: a variance filtering module further comprising a variance filtering cost function optimizing module configured to optimize a variance filter signal cost function for a residual component signal of a target signal of a time series to output estimated variance thereof; and a change point locating module further comprising: a centered cumulative sum computing submodule configured to compute a centered cumulative sum of the estimated variance of the residual component signal over time; and a segmenting submodule configured to segment the centered cumulative sum to yield one or more change of variance points of the target signal.

I. The system as paragraph H recites, further comprising a trend component removing module, which further comprises: a trend removal cost function optimizing submodule configured to optimize a trend removal signal cost function for the target signal to output a trend component signal thereof; and a trend component subtracting submodule configured to obtain the residual component signal by a difference of the trend component signal subtracted from the target signal.

J. The system as paragraph I recites, wherein the variance filtering module further comprises a residual component squaring submodule configured to square the difference of the trend component signal subtracted from the target signal.

K. The system as paragraph I recites, wherein the trend removal signal cost function and the variance filter signal cost function each comprises, respectively, at least a difference penalty function and at least one regularization term.

L. The system as paragraph K recites, wherein each respective difference penalty function comprises a Huber loss function.

M. The system as paragraph K recites, wherein each respective at least one regularization term comprises a sparse regularization term.

N. The system as paragraph I recites, wherein the trend removal cost function optimizing submodule and the variance filtering cost function optimizing submodule are configured to optimize the trend removal signal cost function and optimize the variance filter signal cost function, respectively, by optimizing an augmented Lagrangian operator.

O. A computer-readable storage medium storing computer-readable instructions executable by one or more processors, that when executed by the one or more processors, cause the one or more processors to perform operations comprising: optimizing a variance filter signal cost function for a residual component signal of a target signal of a time series to output estimated variance thereof; computing a centered cumulative sum of the estimated variance of the residual component signal over time; and segmenting the centered cumulative sum to yield one or more change of variance points of the target signal.

P. The computer-readable storage medium as paragraph O recites, further comprising optimizing a trend removal signal cost function for the target signal to output a trend component signal thereof; wherein the residual component signal is obtained by a difference of the trend component signal subtracted from the target signal.

Q. The computer-readable storage medium as paragraph P recites, wherein the residual component signal is obtained by further squaring the difference of the trend component signal subtracted from the target signal.

R. The computer-readable storage medium as paragraph P recites, wherein the trend removal signal cost function and the variance filter signal cost function each comprises, respectively, at least a difference penalty function and at least one regularization term.

S. The computer-readable storage medium as paragraph R recites, wherein each respective difference penalty function comprises a Huber loss function.

T. The computer-readable storage medium as paragraph R recites, wherein each respective at least one regularization term comprises a sparse regularization term.

U. The computer-readable storage medium as paragraph P recites, wherein optimizing the trend removal signal cost function and optimizing the variance filter signal cost function, respectively, each comprises optimizing an augmented Lagrangian operator.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   optimizing a variance filter signal cost function for a residual component signal of a target signal of a time series to output estimated variance thereof;
   computing a centered cumulative sum of the estimated variance of the residual component signal over time;
   segmenting the centered cumulative sum to yield one or more change of variance points of the target signal; and
   optimizing a trend removal signal cost function for the target signal to output a trend component signal thereof, wherein the residual component signal is obtained by a difference of the trend component signal subtracted from the target signal.

2. The method of claim 1, wherein the residual component signal is obtained by further squaring the difference of the trend component signal subtracted from the target signal.

3. The method of claim 1, wherein the trend removal signal cost function and the variance filter signal cost function each comprises, respectively, at least a difference penalty function and at least one regularization term.

4. The method of claim 3, wherein each respective difference penalty function comprises a Huber loss function.

5. The method of claim 3, wherein each respective at least one regularization term comprises a sparse regularization term.

6. The method of claim 1, wherein optimizing the trend removal signal cost function and optimizing the variance filter signal cost function, respectively, each comprises optimizing an augmented Lagrangian operator.

7. A system comprising:

one or more processors; and memory communicatively coupled to the one or more processors, the memory storing computer-executable modules executable by the one or more processors that, when executed by the one or more processors, perform associated operations, the computer-executable modules comprising:

a variance filtering module further comprising a variance filtering cost function optimizing module configured to optimize a variance filter signal cost function for a residual component signal of a target signal of a time series to output estimated variance thereof;

a change point locating module further comprising:

a centered cumulative sum computing submodule configured to compute a centered cumulative sum of the estimated variance of the residual component signal over time, and a segmenting submodule configured to segment the centered cumulative sum to yield one or more change of variance points of the target signal;

a trend removal cost function optimizing submodule configured to optimize a trend removal signal cost function for the target signal to output a trend component signal thereof; and a trend component subtracting submodule configured to obtain the residual component signal by a difference of the trend component signal subtracted from the target signal.

8. The system of claim 7, wherein the variance filtering module further comprises a residual component squaring submodule configured to square the difference of the trend component signal subtracted from the target signal.

9. The system of claim 7, wherein the trend removal signal cost function and the variance filter signal cost function each comprises, respectively, at least a difference penalty function and at least one regularization term.

10. The system of claim 9, wherein each respective difference penalty function comprises a Huber loss function.

11. The system of claim 9, wherein each respective at least one regularization term comprises a sparse regularization term.

12. The system of claim 7, wherein the trend removal cost function optimizing submodule and the variance filtering cost function optimizing submodule are configured to optimize the trend removal signal cost function and optimize the variance filter signal cost function, respectively, by optimizing an augmented Lagrangian operator.

13. A computer-readable storage medium storing computer-readable instructions executable by one or more processors, that when executed by the one or more processors, cause the one or more processors to perform operations comprising:

optimizing a variance filter signal cost function for a residual component signal of a target signal of a time series to output estimated variance thereof;

computing a centered cumulative sum of the estimated variance of the residual component signal over time;

segmenting the centered cumulative sum to yield one or more change of variance points of the target signal;

optimizing a trend removal signal cost function for the target signal to output a trend component signal thereof, wherein the residual component signal is obtained by a difference of the trend component signal subtracted from the target signal.

14. The computer-readable storage medium of claim 13, wherein the residual component signal is obtained by further squaring the difference of the trend component signal subtracted from the target signal.

15. The computer-readable storage medium of claim 13, wherein the trend removal signal cost function and the variance filter signal cost function each comprises, respectively, at least a difference penalty function and at least one regularization term.

16. The computer-readable storage medium of claim 15, wherein each respective difference penalty function comprises a Huber loss function.

17. The computer-readable storage medium of claim 15, wherein each respective at least one regularization term comprises a sparse regularization term.

18. The computer-readable storage medium of claim 13, wherein optimizing the trend removal signal cost function and optimizing the variance filter signal cost function, respectively, each comprises optimizing an augmented Lagrangian operator.

* * * * *